United States Patent
Friman (10) Patent No.: US 7,162,483 B2
(45) Date of Patent: Jan. 9, 2007

(54) METHOD AND APPARATUS FOR SEARCHING MULTIPLE DATA ELEMENT TYPE FILES

(76) Inventor: Shlomo E. Friman, 1810 Cheyenne Dr., Richardson, TX (US) 75080

( * ) Notice: Subject to any disclaimer, the term of this patent is extended or adjusted under 35 U.S.C. 154(b) by 298 days.

(21) Appl. No.: 10/195,147

(22) Filed: Jul. 15, 2002

(65) Prior Publication Data

US 2003/0046299 A1    Mar. 6, 2003

(51) Int. Cl.
G06F 17/00    (2006.01)
G06F 17/30    (2006.01)

(52) U.S. Cl. .............................. 707/102; 707/2; 707/3

(58) Field of Classification Search .............. 707/1–10, 707/100–104.1
See application file for complete search history.

(56) References Cited

U.S. PATENT DOCUMENTS

| | | | | |
|---|---|---|---|---|
| 5,848,410 | A | * | 12/1998 | Walls et al. .................... 707/4 |
| 5,983,216 | A | * | 11/1999 | Kirsch et al. ................... 707/2 |
| 6,012,067 | A | | 1/2000 | Sarkar |
| 6,018,744 | A | | 1/2000 | Mamiya et al. |
| 6,023,762 | A | * | 2/2000 | Dean et al. ................... 713/193 |
| 6,052,693 | A | * | 4/2000 | Smith et al. ............. 707/104.1 |
| 6,243,713 | B1 | * | 6/2001 | Nelson et al. ........... 707/104.1 |
| 6,347,312 | B1 | | 2/2002 | Byrne et al. |
| 2005/0091287 | A1 | * | 4/2005 | Sedlar ........................ 707/200 |

FOREIGN PATENT DOCUMENTS

CA    2292311    6/2000

* cited by examiner

*Primary Examiner*—Joon Hwan Hwang (57) ABSTRACT

Method and apparatus is disclosed for constructing, and updating, a searchable database from very large data collections including diverse types of data thus enabling the data to be cataloged, data mined, indexed, parsed, cross-referenced and published for rapid location and free text retrieval of data elements from terabytes of information or millions of elements. The method and apparatus enables full text searches with the aid of an Internet browser using very complex search criteria without special skills. The full text searches are performed on a searchable database developed from the data collections in a large data storage system and wherein data type elements are identified, hyperlinked when possible, and stored in a retrievable format. In addition to the searchable database, a database is constructed that shows graphically the relationships between a current module being viewed and any other modules the current module may reference or be referenced by.

23 Claims, 8 Drawing Sheets

METHOD AND APPARATUS FOR SEARCHING MULTIPLE DATA ELEMENT TYPE FILES

BACKGROUND OF THE INVENTION

1. Field of the Invention

This invention relates to the field of automated information processing and particularly to searching large databases comprised of multiple data types.

2. Brief Description of the Prior Art

Large data storage and processing systems, such as are found in Fortune 500 computer data centers, typically store vast amounts of information on mainframes, minicomputers and other servers. A typical mainframe IT site may deal with numerous operating systems, applications programs, job control languages, processing and control routines, disk file storage schemes and files having unique and incompatible data types and data element structures. Data type elements included in copybooks, includes, assembler files, data definitions, vsam files, adabas dbms, and Natural programs will be found along with multiple data types such as those found in COBOL, PL1, assembly languages, etc.

Searching among the multiple data types and elements is cumbersome and slow. It requires very specific knowledge about the data types to be searched, job control language knowledge, and deep understanding of the overall data environment. Even when performed by technicians having considerable skill, the process involves many cycles of CPU processing—which translates to time and money. If multiple data types must be scanned, each type must normally be scanned individually and with each scan utilizing its own set of rules and methods. Understandably, this complexity often results in incomplete searches and missed information In many cases, the results are provided in a form that cannot be further processed on a pc, mac, or Unix based microcomputer computer with conventional tools like Microsoft Word or Excel.

One prior art system provides a corporate repository tool that will allow searches for relationships between jobs, programs, controls, copybooks and procedures. However, this approach does not support the Natural programming language, adabbas, emails, and many other data types. It also does not offer full text retrieval of an actual data element. That is, it deals only with relationships between data elements and does not permit visual inspection of the actual data element text on a browser window.

Another prior art system, described in Canadian patent application Ser. No, CA2292311, published Jun. 17, 2000, provides a tool that can catalog similar types of items by specifying in advance certain classes in certain locations of text elements. This method is not practical when every word of every element in many data types must be analyzed. The tool also does not provide free text searching for cataloged data.

Search tools including Google, Verity and Dtsearch simply index a directory or location to make it free text searchable. They do not hyperlink between the elements and data types. Nor do they offer cross-referencing to permit observation and analysis of the flow within data elements.

The Natural programming language offers a cross reference within its own members—however, it cannot offer cross reference linking among different data types. A search may be run only on the current machine where the Natural system file exists.

Present search options available to IT professionals trying to locate data on a mainframe are user unfriendly, archaic and primitive. The known search tools are incapable of effectively browsing and searching for items or text among multiple data types. The limited capabilities that exist to perform less complicated search tasks are excessively slow. Efforts to resolve the infamous Y2K problem by scanning vast quantities of code and data revealed clearly the importance of more efficient and reliable search tools. There is a need for a search tool that permits operators and clients of large information databases containing multiple data types to search their information quickly, accurately and easily with a web-based interface that provides the capability to jump from program to program and visually see the modules.

SUMMARY OF THE INVENTION

The present invention permits very large data collections including diverse types of data to be efficiently cataloged, data mined, indexed, parsed, cross-referenced and published. It enables the immediate location and free text retrieval of data elements from terabytes of information or millions of elements. A search task that may have taken many hours or even days on a mainframe will require only seconds on a microcomputer with much more accurate results. Full text searches using very complex search criteria require no special skills and may be performed with the aid of an Internet browser.

A search in accordance with the present invention is performed on a unique searchable database developed from the information resident in a corporate database or other large data storage system. Within the searchable database, data type elements are identified, indexed and stored in a retrievable format. All data type elements, both those within a single data type and those in all other data types, are hyperlinked when a possible connection exists. This makes it easy to follow the flow between the data elements of different data types. The identified connections and relationships among all elements in all data groups and at multiple levels are viewable on a minicomputer with an Internet browser, which permits searcher to drill down into the functional flow of systems. The ability is provided to immediately locate and retrieve elements using free text retrieval of elements within terabytes of information and/or millions of elements.

In addition to the searchable database, the present invention provides a database (referred to below as the XREF database) that shows graphically the relationships between a current module being viewed and any other modules the current module may reference or be referenced by. The XREF database permits review of multiple levels of referencing, with some levels showing which modules are referenced and other levels showing modules that are referenced by the current module. Search results may be displayed either in html or plain text.

Also accompanying the searchable database is a usage monitoring and security tool. This tool runs in the background and keeps track of persons accessing the searchable database. It monitors who is performing the search, and from where, and keeps a record of prior searches performed by each user. It also can block certain users from the search capability. The search tool of the present invention may optionally be accessed on-line via any web browser. The analyzer may also contain a tool to calculate dollars saved by using the invention.

The invention will likely be used for processing data in large mainframe environments due to the particularly difficulty of browsing, searching, and locating items or text among multiple data types and due to the very long duration these tasks require. Alternatively, however, the invention may be applied across multiple platforms including, for example, Windows, Unix, and graphics-based systems, and across multiple data types including, for example, vbasic and Java files.

DETAILED DESCRIPTION OF THE PREFERRED EMBODIMENT

Figure 1:
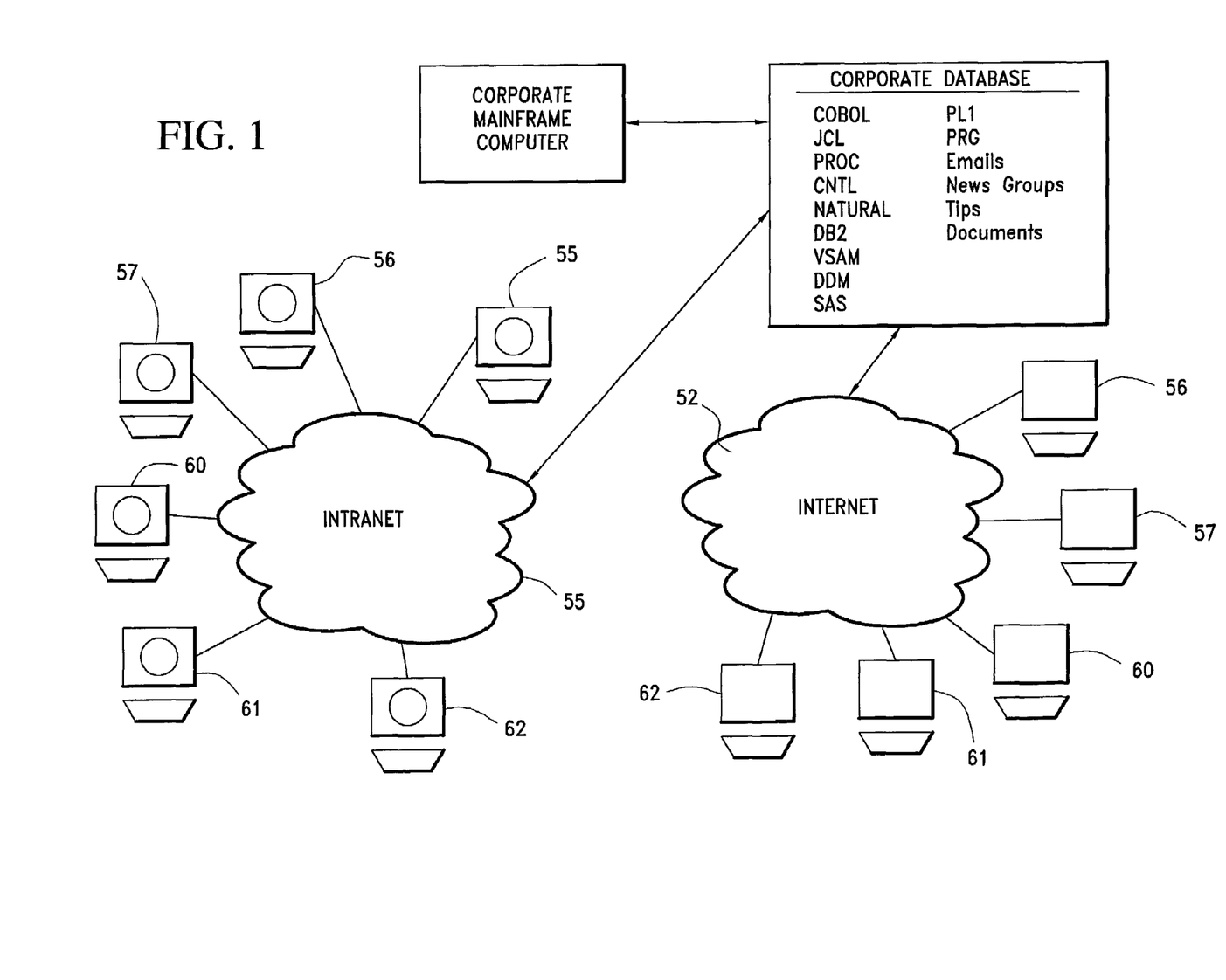
FIG. 1 illustrates a typical prior art large corporate mainframe environment

FIG. 1 illustrates a typical prior art large corporate mainframe environment in which a mainframe computer 50 is connected to a large data storage device 51. The storage device is connected to a corporate intranet 52 as well as to the public Internet 55. Authorized clients may access the stored data through computers connected either directly to the mainframe, such as computer 53, or through computers connected to either intranet 52 or Internet 55. Client computers will normally include wide varieties of types, including microcomputers 56 running Windows or NT operating systems, microcomputers 57 running Macintosh OS operating systems, microcomputers 60 running Unix operating systems, minicomputers 61, and mainframes 62. Computer 53 may similarly be any of the same representative types of computers. Computers connected directly to the mainframe can access mainframe files directly. Terminals connected through the intranet or the Internet can log on as mainframe clients. Such a corporate information system environment necessarily means that storage facility 51 will include diverse types of data, applications, and languages. Performing comprehensive searches for information in the database is a highly complex and time-consuming process.

Figure 2:
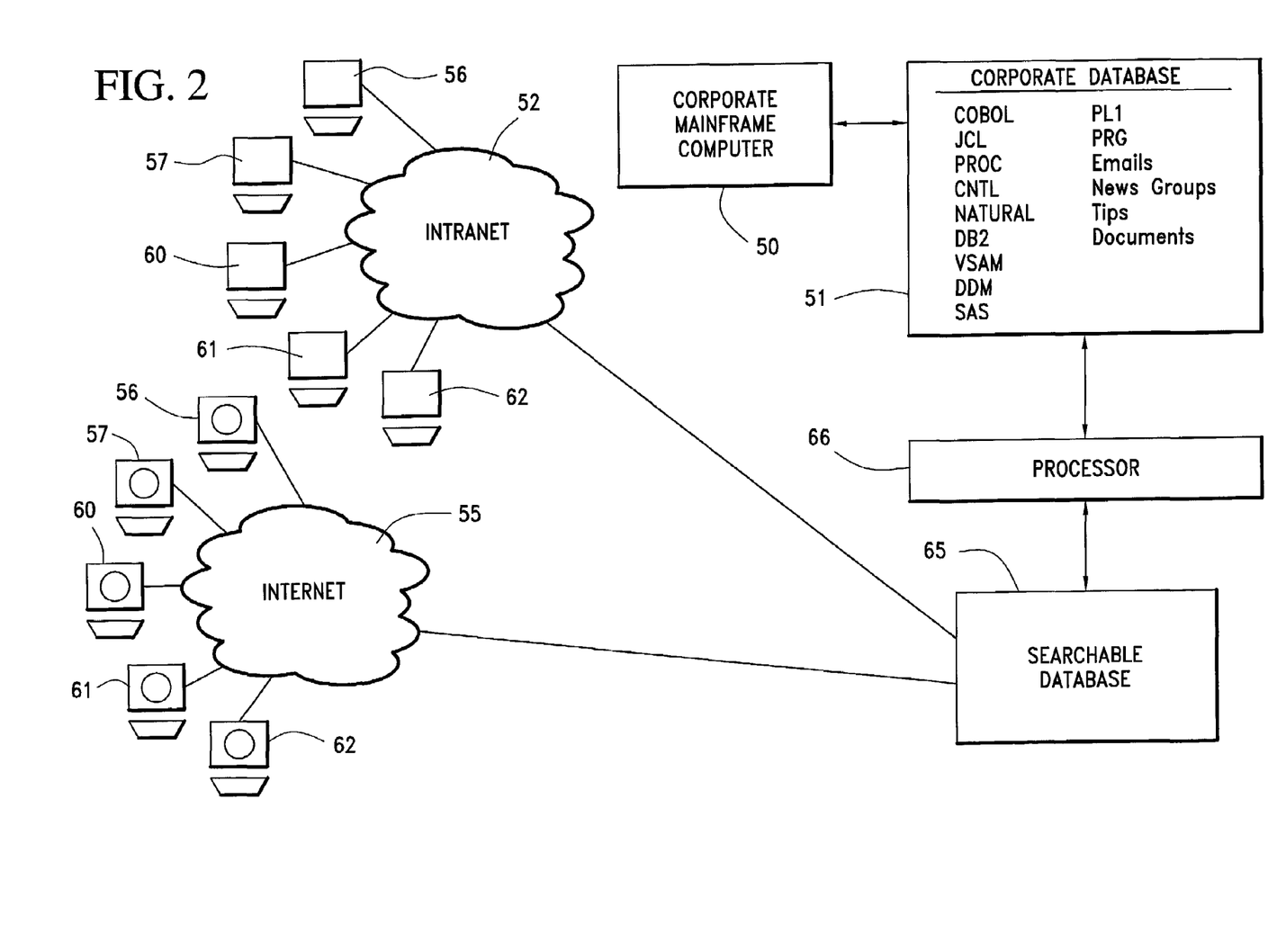
FIG. 2 illustrates the environment of FIG. 1 with the incorporation of the present invention using a distributed platform for the web server.

FIG. 2 illustrates the environment of FIG. 1 with the addition of the present invention using a distributed platform 64 for the web server. A searchable database 65 is populated with all of the searchable data elements resident in corporate database 51 in an ordered structure to be described below. A processor 66 structures the mainframe data, removes unprintable characters, and transfers the data to database 65 by FTP or similar bulk transfer protocol. Distributed platform 64 will likely use Windows NT, Unix or SUN OS for an operating system.

Figure 3:
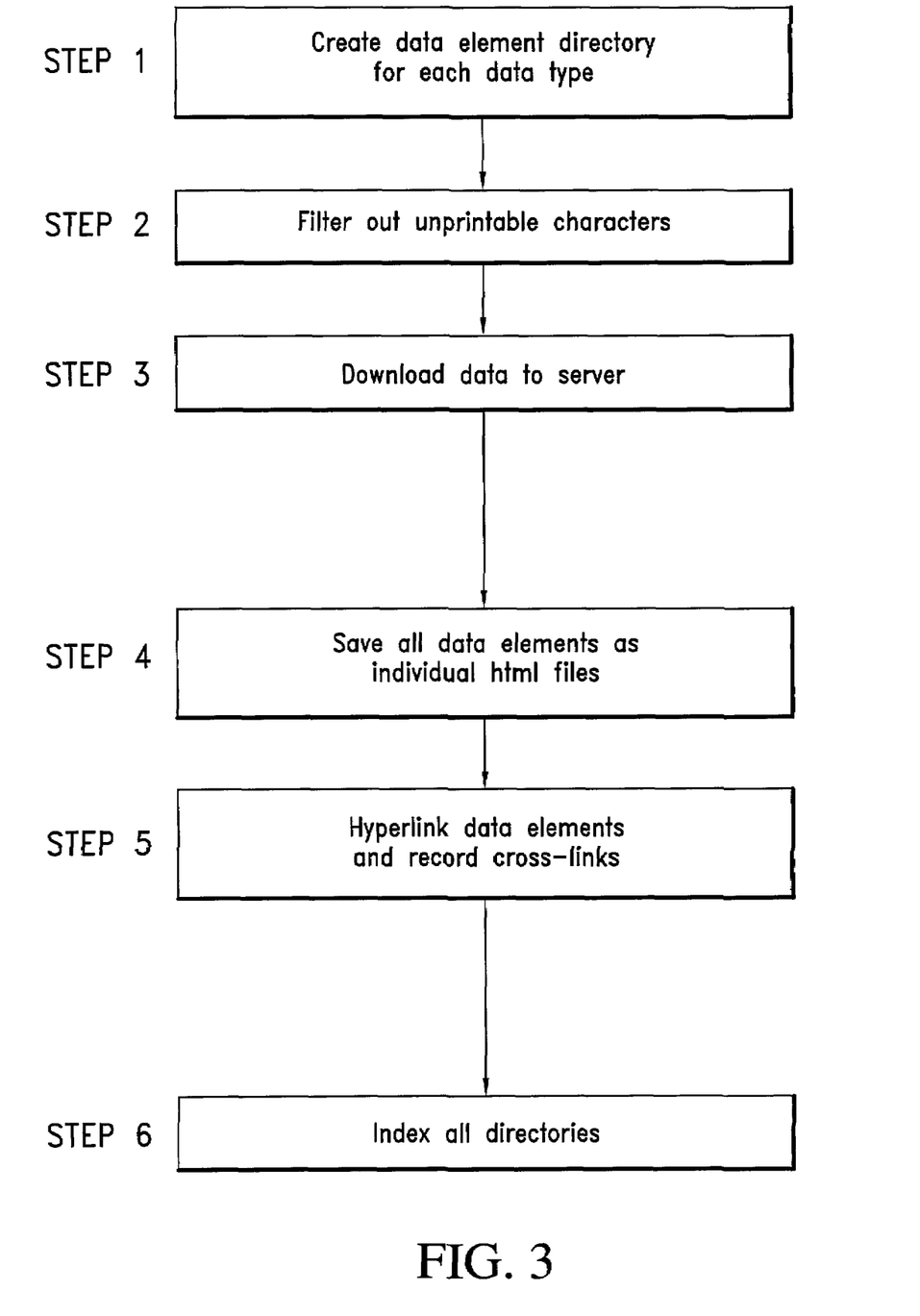
FIG. 3 illustrates a process for building a searchable database in accordance with the present invention

FIG. 3 illustrates the process for building a searchable database in accordance with the present invention. Thereafter, the same process may be run against the corporate database at regular intervals, such as weekly or biweekly, to keep the searchable database current. Updating the searchable database by running the process of FIG. 3 is relatively simple and might advantageously be used by organizations with relatively smaller corporate databases. No effort is made to track changes in the database over time, for at each interval the process is initiated anew. Smaller data shops would most likely be the primary users of this embodiment.

Figure 4:
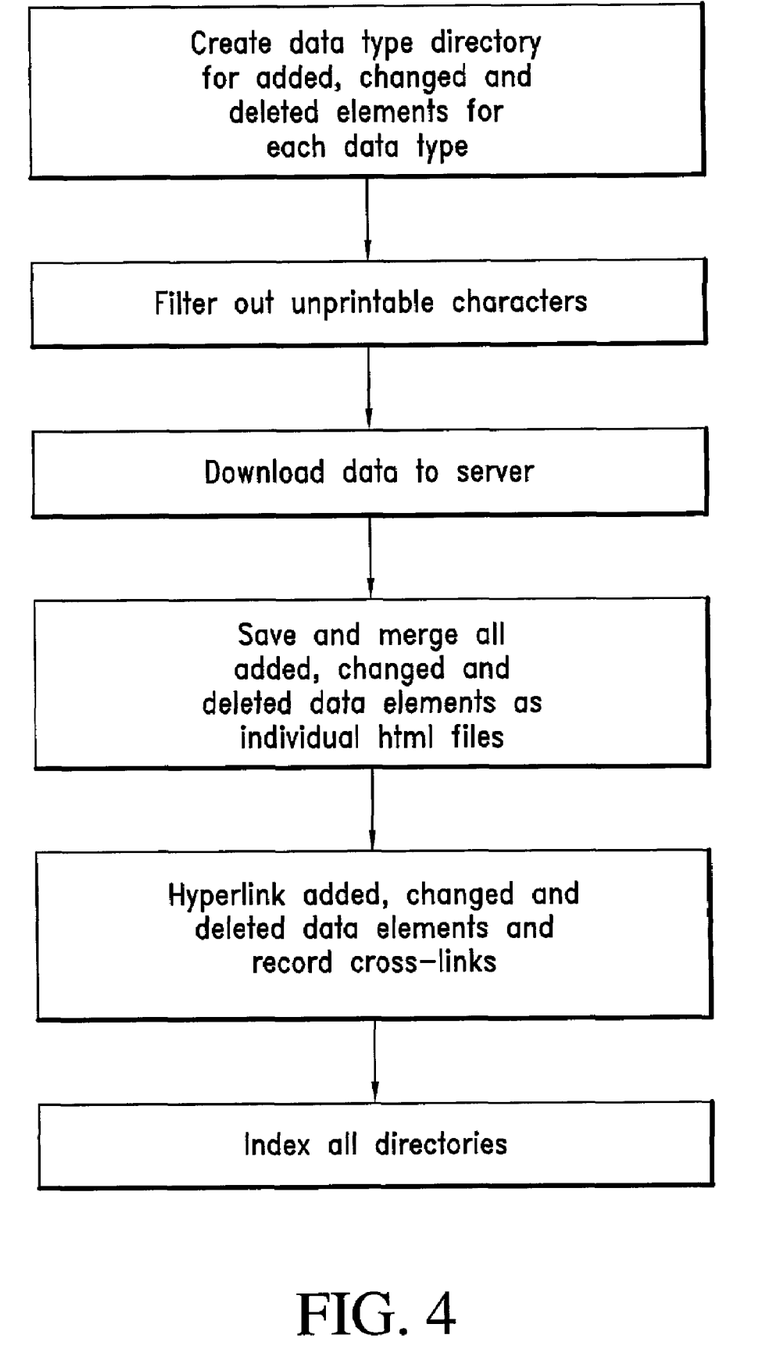
FIG. 4 illustrates a process for updating a searchable database created in accordance with the process of FIG. 3

The process illustrated in FIG. 4 is a more capable and robust process for updating the searchable database and will likely be preferred by larger organizations with more complex data archiving and retrieval requirements. It is most useful for frequently updated data or very large databases, and may be performed (after a necessary initial run of the first process) much more quickly than the first process. As will be described further below, this method also creates a searchable history of database changes that provides potentially important information for auditing and other purposes. It is likely that, even with use of the alternative process, a complete harvesting of all data in accordance with the process of FIG. 3 would be conducted on a periodic basis, such as every quarter, to insure against discrepancies. Each process may be generally characterized as (1) Parsing, (2) Hyperlinking, (3) XREFing, and (4) Indexing, as will be more fully explained below.

Initially, a data processing professional will review the corporate database contents to determine all of the various data types that it contains. Once the various data types have been identified, software that is well known in the prior art, one program for each identified data type, is selected for finding and identifying each data element that corresponds to a selected data type. For example, COBOL data elements are collected using PUNCH or PRINT mainframe utilities, as are JCL, PROCS and CNTL data elements. Natural ADABAS data elements may be collected using SOFTWARE AG utilities. Emails may be collected by saving all emails as a single ascii text file.

With reference to FIG. 3, In Step 1, a group of directories is created, with one directory for each data type. The entire corporate database is scanned with each of the above programs, and the file corresponding to each data type is filled with the data elements of that type found by the program.

In Step 2, all data collected in Step 1 is filtered to remove any characters that are unprintable and may cause unpredictable results if processed by a PC, Macintosh or Unix computer. The program HEXCONV is suitable for performing the function of removing unprintable characters from the mainframe files.

In Step 3, the data elements that were collected in Steps 1 and 2 are downloaded to another server using FTP, NDM or any other tool permitting the transfer of data among mainframes, minicomputers and microcomputers, and stored. This database will be referred to below as the "searchable database."

During Step 4, another parsing operation is performed. During this pass through the data, files containing data elements are parsed by element name. Each data element is saved as an individual html file in the directory corresponding to that data type.

Step 5 begins with an examination of every word (alphanumeric combination) of every data element. If the word exists in the element database the following occurs:

a. The word is hyperlinked to the existing data entry in the element database;

b. If there is more than one entry in the element database, then more than one hyperlink is made available to that word. A code adjacent to the hyperlink indicates to what data type the hyperlink refers; and c. A cross-reference record is added to an xref database, indicating that the current data element being parsed is linked/referenced/connected to the data elements that were found in the elements database.

In Step 6, once all data elements have been parsed and their html files have been created in their appropriate directories, an index of all the directories of all data types is created using a conventional search engine such as Verity or Dtsearch.

The alternative update process begins only after the process of FIG. 3 has been completed and a time interval has passed. Thereafter, it looks at and processes only changes, additions, and deletions to data elements that occur during the time intervals since the previous update.

With reference to FIG. 4, in Step 1, a group of directories is created, with one directory for each data type. The entire corporate database is scanned with each of the above programs, and the data elements are compared against an index in the corporate computer that was generated during the previous run. Those data elements that are unchanged are ignored and the file corresponding to each data type is filled with the data elements that are identified as added, deleted, or changed.

In Step 2, all data collected in Step 1 is filtered to remove any characters that are unprintable and may cause unpredictable results if processed by a PC, Macintosh or Unix computer.

In Step 3, the data elements that were collected in Steps 1 and 2 are downloaded to another server using FTP, NDM or any other tool permitting the transfer of data among mainframes, minicomputers and microcomputers, and merged into the existing database.

During Step 4, another parsing operation is performed. During this pass through the data, files containing added, changed or deleted data elements are parsed by element name. Each data element is saved as an individual html file in the directory corresponding to that data type. An archives database is generated as a repository for deleted data elements.

In Step 5, data elements that were identified as deleted from the mainframe database are updated as archived in the searchable database. If these archived elements are subsequently referenced in any element search, the search results will contain a report indicating the fact.

In Step 6, once all data elements have been parsed and their html files have been created in their appropriate directories, an index of all the directories of all data types is created using a convention search engine such as Verity or Dtsearch.

As previously described, development of a searchable database begins with an analysis of corporate database 51 to learn the types of data elements it contains and to define the necessary text files to be included in the searchable database. For purposes of the description that follows, it will be assumed that the searchable database will include three text files; one for Natural data elements, one for COBOL data elements, and one for OTHER data elements. It should be understood that the OTHER text file in this context is a representative name for which one might substitute PL1, DB2, JCL or any other data element type found in the corporate database. Each data element type will have its own text file and there may be hundreds of such text files in a working embodiment of the invention.

Figure 5:
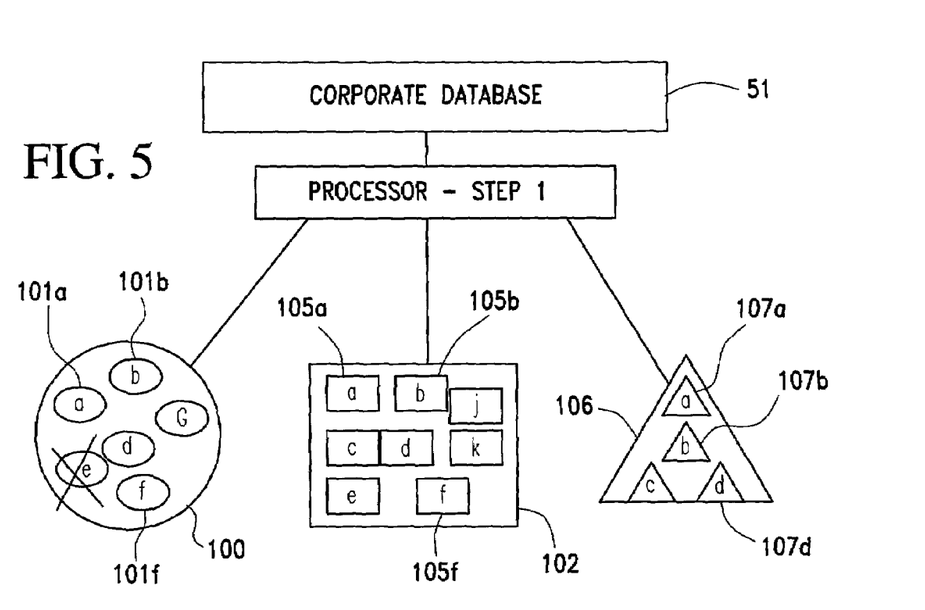
FIG. 5 illustrates the database development in accordance with Processor Step 1

With reference to FIG. 5, data is read from the mainframe into large database files with fixed delimiters between elements. Large circle 100 represents a large text file with Natural data elements 101a, 101b, . . . 101f contained within, each of the data elements being separated by a reserved keyword or line. For example, the mainframe database might contain an index containing the date when each program was last saved. By adding a unique keyword at the top of the html file such as "XKS-DATESAVED=YYYYMMDD," that keyword can be used as a search criteria. If "XKS" is a unique letter combination, the search engine will retrieve only that specific field. Without such a unique keyword, such as simply calling the field "DATE," the search engine would find all occurrences of the word "DATE," including many that were not pertinent to the intended search. By adding a full line of such unique keywords, a search could be even more precisely structured. It is important that the unique identifiers be carefully selected to minimize the likelihood that they occur in the text of other data elements. Such terms as "YTD, BTW, PS, FYI" would be poor keywords because of their likely common use throughout the database text. A more arbitrary keyword, such as "XKS," allows a search to be more accurate since, for example, a search for "XKS-DATELOADED=2001*" would likely retrieve only programs loaded during the 2001 year.

Large square 102 represents a large text file with many COBOL programs and copybook element s 105a, 105b, . . . 105f contained within, again separated by a reserved keyword or line. Large triangle 106 represents a large text file with many "OTHER" data elements 107a, 107b, . . . 107 separated from one another by a reserved keyword or line. The OTHER data types would likely include PL1, ASSEMBLER, FORTRAN, VSAM, ADABAS, DB2, and RPG data types among others. Each data type will have a single large text file with all the data elements of that type included with each data element separated by a reserved keyword or line. The specific data types to be included will be initially determined by an audit of the mainframe database. Each keyword separator will be unique to permit identification of the data element during a search.

Figure 6:
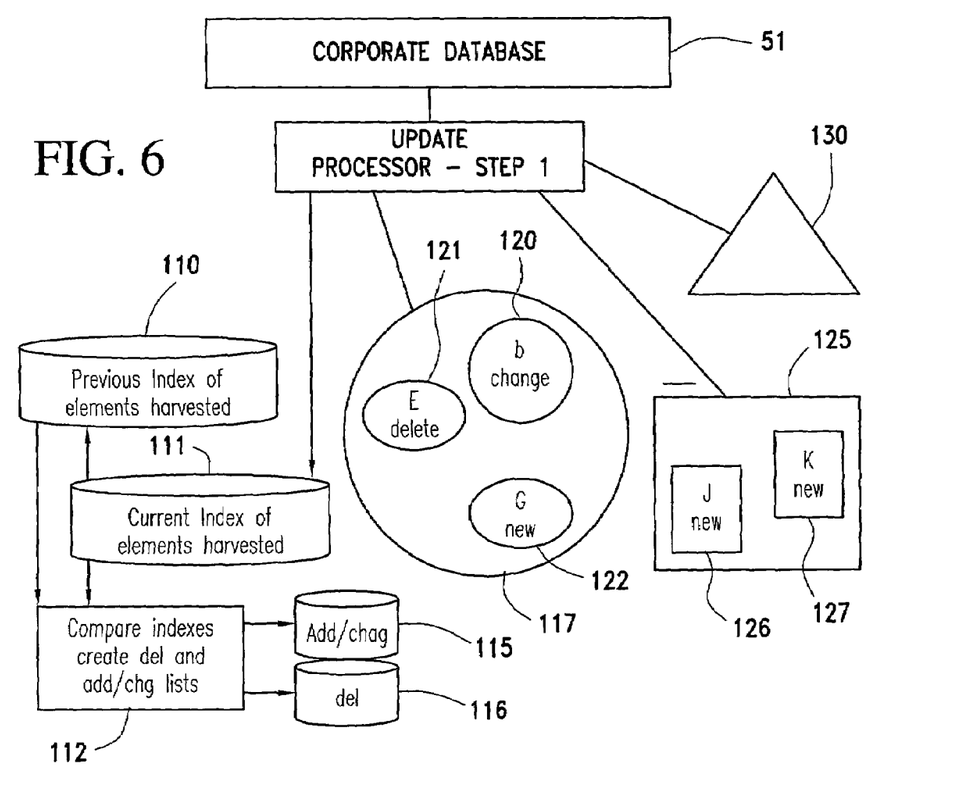
FIG. 6 illustrates the database development in accordance with Processor Step 1 including the update process

FIG. 6 illustrates development of the add/change/delete capabilities in the more complex embodiment of FIG. 4. The process begins with generation of a database containing three text files 100, 102 and 106 as previously described, except that an initial index of the mainframe database is also generated. The index is stored with date and time stamps of each element and is identified as previous index 110. Each succeeding time Step 1 is performed, a current index 111 is created. A comparison algorithm 112 compares previous index 110 and current index 111, and two lists, an Add/change list 115 and a Delete list 116 are generated. Large circle 117 represents a file of those Natural data type elements that were found to require updating, with small circle 120 representing a data element to be changed, small circle 121 representing a Natural data element to be deleted, and small circle 122 representing a new Natural data element to be added. Similarly, large rectangle 125 represents a file of those COBOL type elements that were found to require updating, with small rectangles 126 and 127 representing new COBOL data element to be added. Empty large triangle 130 represents an OTHER data type file for which comparison has indicated no required changes. At this point current index 111 becomes the previous index 110 in preparation for the next time Processor Step 1 is initiated.

Mainframe data includes EBCDIC characters that are not recognizable, and thus are not printable, by a microcomputer. Development of the searchable database requires that such characters be removed, which is the function of Processor Step 2. Removal of these characters would additionally be necessary to permit use of FTP file transfers of data from the mainframe to the minicomputer.

Figure 7:
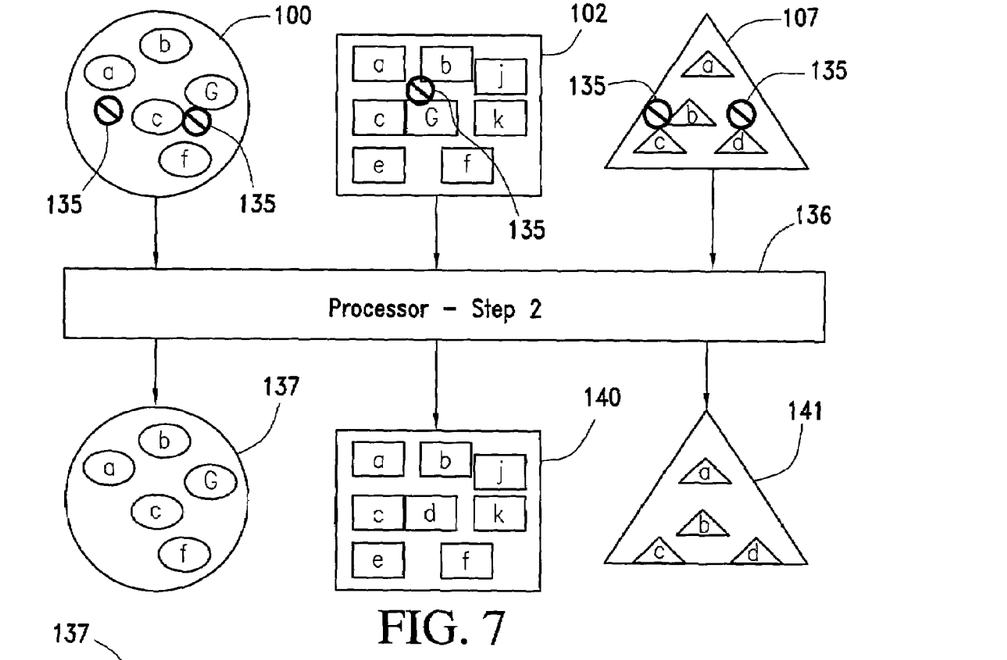
FIG. 7 illustrates the removal of unprintable elements from a database in accordance with Processor Step 2

FIG. 7 illustrates the previously described Natural data file 100, COBOL data file 102 and OTHER data file 107, each containing unprintable data elements 135. Each of the data files is processed with an algorithm 136, such as the well-known CONVHEX program for Natural files, to remove the unprintable data elements and yield cleansed Natural data file 137, COBOL data file 140, and OTHER data file 141.

Figure 8:
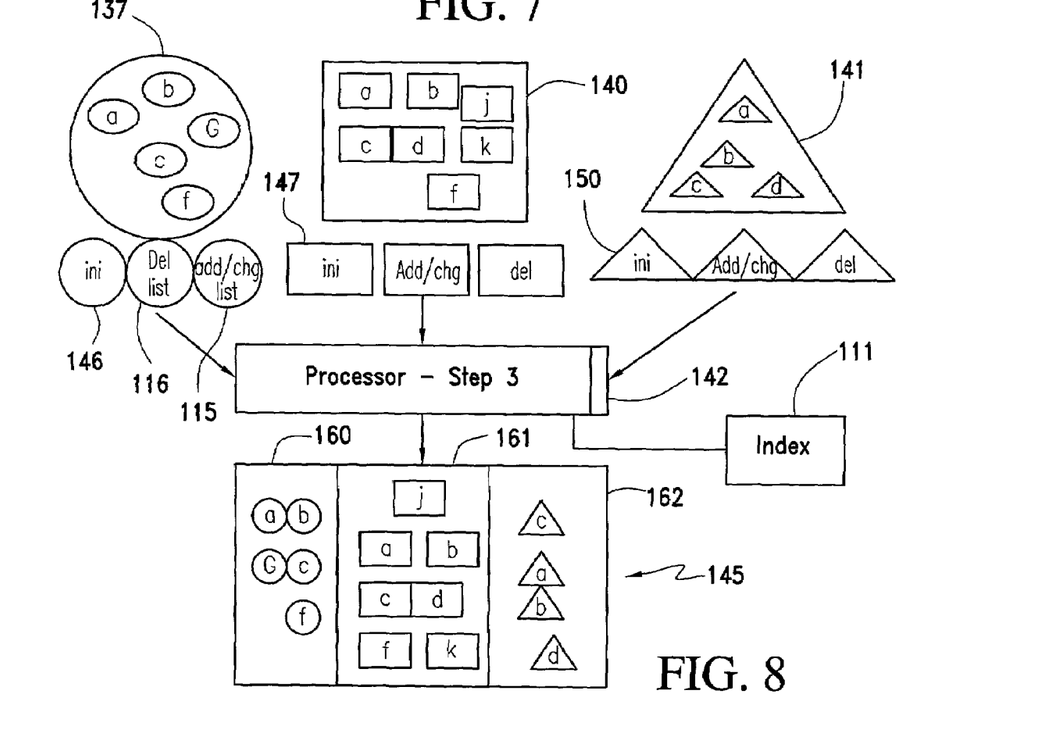
FIG. 8 illustrates generation of an elements database in accordance with Processor Step 3

FIG. 8 illustrates Processor Step 3, during which processor 142 analyzes the syntactic structure of the cleansed data files 137, 140 and 141, assembles the data elements resident in each file, and generates an elements database 145 on minicomputer server 65 (FIG. 2). Each of the files 137, 140 and 141 are read top to bottom sequentially and all element names within each file are identified. An INI file 146 associated with the Natural database 137 describes the location of each data element in the database. Similar INI files 147 and 150 exist for the COBOL database 140 and the OTHER database 141 respectively. Each INI file also has in it the data element separator identifier. Parser algorithm 142 uses the corresponding INI file to access each of the INI files 146, 147 and 150 in turn. As each file is read from top to bottom, in the initial run, the data elements that are found are written to elements database 145, and for each data element the element name and data type are stored. In accordance with the update process described with respect to FIG. 4, the mainframe may also create an index file 111 of all the add/change/delete element names. In this case the initial read of Natural database 137 by processor 142 will be to add/change/delete files 115,116 to load elements database 145 and not to files 137, 140 and 141 directly. Similar add/change and delete files for each data type database will be read by parser 142 to complete the population of elements database 145. When an element is deleted from the corporate database, the processor queries the XREF database to determine all the elements related to the deleted element. This information is made available to an operator with two options:

(1) the operator may choose to leave the hyperlinks in those elements that link to the deleted element; however, the processor strips out all text in the deleted element and replaces it with the message "This module archived/deleted on [date]", or (2) a new DELETE list is compiled and the XREF database is queried by the processor to record every element that was related to the deleted element. The recorded elements are added to the CHANGE list, and then the CHANGE list is re-hyperlinked without reference to the deleted element. A report is generated and displayed each time a subsequent database query references a deleted (or archived) module.

Following Processor Step 3, the elements database 145 contains all the elements and their related data types that were harvested from the mainframe within directories 160, 161, and 162.

With reference to FIG. 9, processor 142 now again reads, from top to bottom, the individual data element files 137, 140, 141. Processor 142 performs four operations during Step 4.

Figure 9:
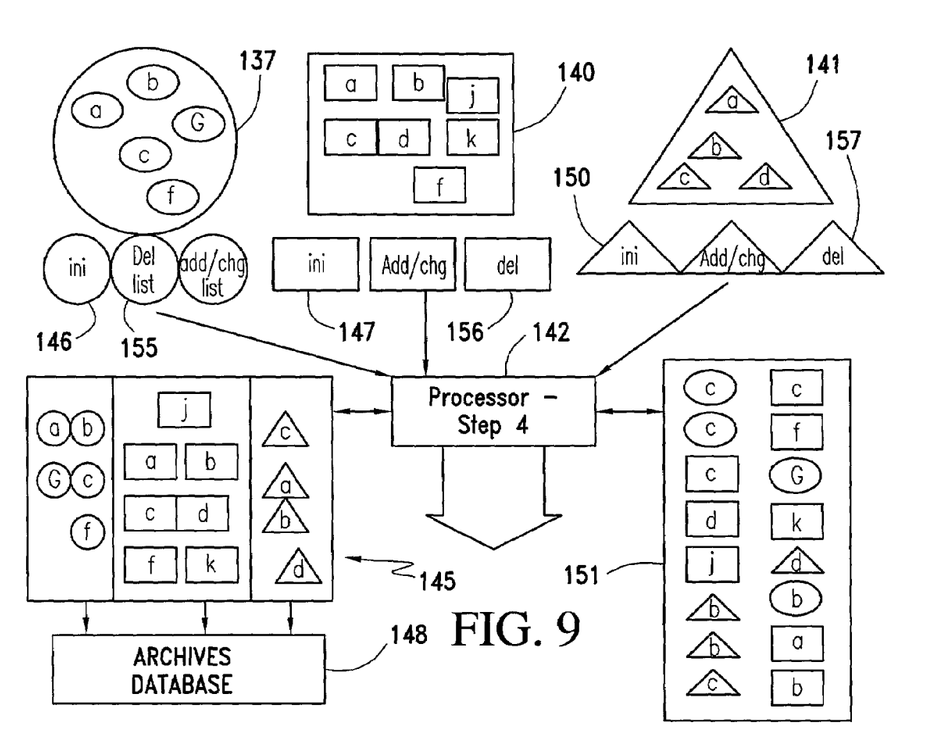
FIG. 9 illustrates the generation of a hyperlinked searchable database in accordance with Processor Step 4
Figure 10:
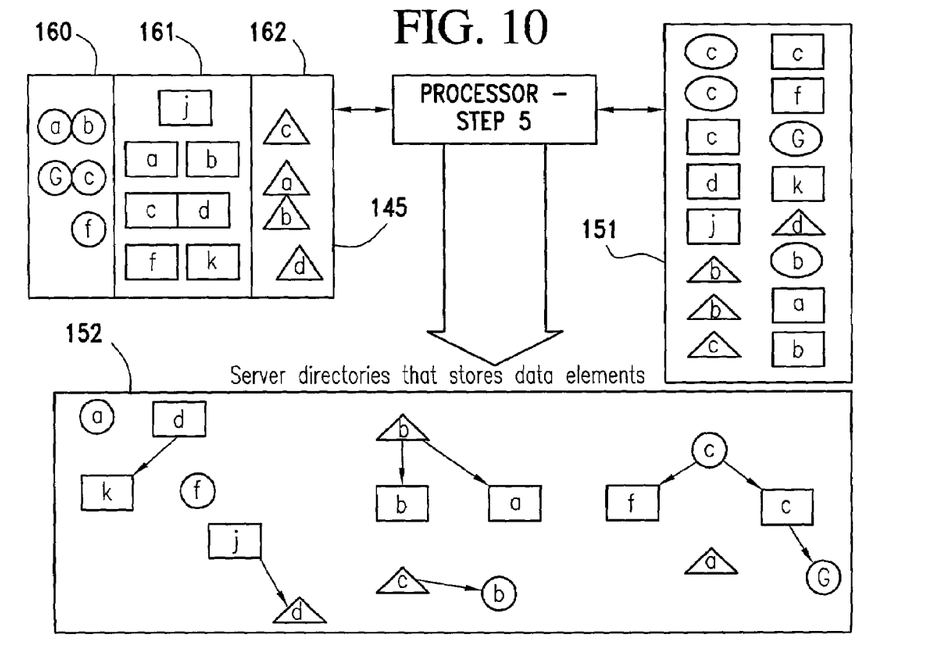
FIG. 10 illustrates the indexing of a searchable database in accordance with Processor Step 5.

Operation 1—Hyperlinking of data elements. As files 137, 140 and 141 are read, the character string contained in each data element is compared against the data in elements database 145. If the character string is found in the elements database then that data element is hyperlinked to the corresponding element in the elements database. If more than one element contains that character string, then multiple hyperlinks are created. Each hyperlink includes an indicator to identify the data type associated with the character string. For example, if the character string "dateupd" is found, the system looks up the word "dateupd" in the elements database 145. Assume that the word "dateupd" has two entries in elements database 145, one for Natural and one for COBOL. The new element will be saved as an individual html file and in it the word "dateupd" will be hyperlinked to both the Natural version of "dateupd" and the COBOL version of "dateupd." The INI file 146, 147, 150 of the corresponding element contains all the information regarding the hyperlink. In the INI file is the server directory for each data type. The INI file also contains headers and footers for the html code that is used in creating small html files from each data element. Finally, the INI file may also contain a stoplist file for each data type. In the stoplist file are words that will not be hyperlinked even if a match on the ELEMENTS DATABASE is found. For example; if the environment has a data element named "read", of type COBOL, which is extensively used but has little value as a search term, it would serve no useful purpose to hyperlink every word "read" in every element across the corporation to the COBOL "read" element. The stoplist contains those words per element that will be ignored during the hyperlink process.

Operation 2—Creation/update of cross reference database. As the elements are being written to smaller individual html files, and the hyperlinks are processed as described above, each time a hyperlink is processed an XREF (cross reference) record is written to an XREF database 151. Each time a hyperlink is written it means that there is a link between the module being processed and another module whose text name appears in the module being processed. This XREF record can be between one, two, or more data types. Each of these links will be a cross-reference entry in the XREF database. For example, in the above example there would be two XREF records; one for element a making reference to "dateupd" in Natural and one for element a making reference to "dateupd" in COBOL.

Operation 3—Saving each data element as an individual html file. As the data elements are read from files 137, 140 and 141, they are saved as individual html files into the designated server directories as entered in the INI file for each data type. Each data type also may have a header and footer html file defined to change the looks and feel of each data type. Each html file header will also have a function button for running the XREF process and a text box for inputting a new module name to XREF. The individual html files are the actual files that will be displayed to the user on the web browser when doing a search. While the html files are being generated by the system automatically—the processor inserts a few lines at the top of the file. These few lines contain in them a small "web form" that will show up as a "button" on top of the html page with the word "VIEW XREF" on it. The form can take in a parameter of "MODULE NAME"—so the form will be pre-populated with the current module being processed, i.e., the one being written to html. That way—the user clicks on VIEW XREF and the program that does the XREF is called—with the current module as the parameter.

Operation 4—Quality assurance checks for usage of archived elements. Elements that are deleted from the system are stored in an archive database under control of the delete list 155, 156, and 157 for each data file 137, 140, and 141 respectively. If, while processing the data elements, the processor detects an existing link to an archived module, it writes out a report that can be later accessed online for quality assurance reasons.

After the completion of Processor Step 4, all the data type elements have been saved into the specified searchable database server directories 160, 161, and 162. Each html file is hyperlinked to all other member names it references in it=s source text. The XREF database contains all of the relationships available between the different data types.

One important benefit of the present invention is to take the search and retrieval capability off of the corporate mainframe and make it available on a distributed platform. This can save a company considerable money because mainframe processing pressure is alleviated by the many people who would otherwise be logging on to the mainframe to view and print searches. With an alternative embodiment of the present invention, however, the entire process may be carried out entirely on the mainframe itself.

Figure 11:
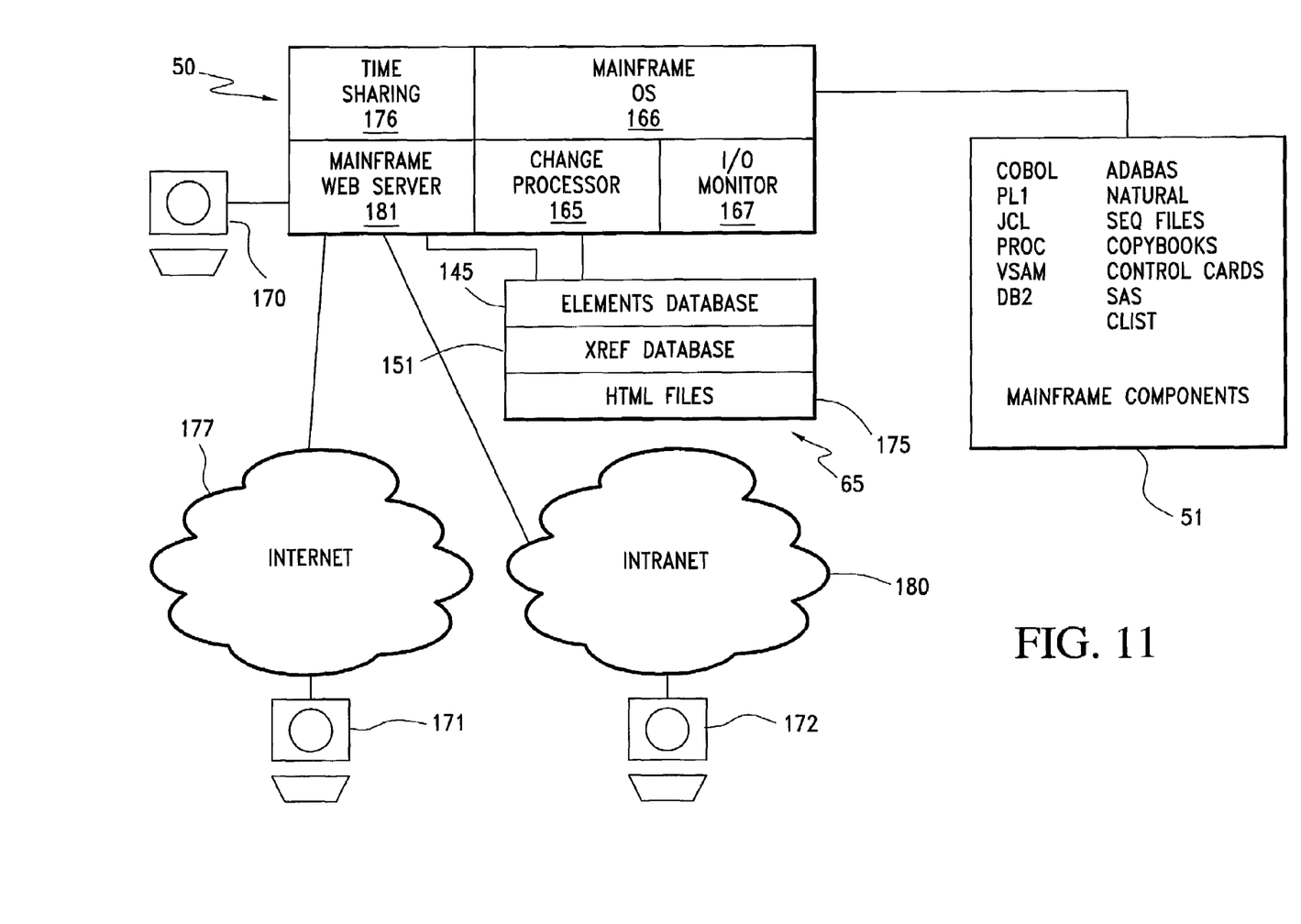
FIG. 11 illustrates the environment of FIG. 1 with the incorporation of the present invention using the mainframe as the platform for the web server.

FIG. 11 illustrates an alternative embodiment of the environment of FIG. 1 with the incorporation of the present invention without using a distributed platform. All processing and storing of the previously described searchable database 65 are performed directly on mainframe 50. Data changes (additions, deletions, modifications) within the mainframe information base 51 are monitored by well-known Input/Output monitoring software 167 such as Changeman or Pegasys. Detected changes activate a code processor 165 to update the searchable database 65, including the elements database 145 containing hyperlinked html files and the XREF database 151. The searchable database 65 may be any type of database supported by the mainframe operating system 166. A client computer 170, 171 or 172 can make a search query to mainframe 50 through time-sharing software 176. Mainframe code processor 165 responds to the query requests and creates hyperlinked html files 175 that may be made accessible to the clients through mainframe web server 176. A client computer 170 may be directly linked to mainframe 50 or client computers 171 or 172 may be connected through the Internet 175 or an intranet 176 respectively. The full text search will be performed using a search engine that is supported by the mainframe such as Intetext, by SPL Worldgroup. A significant advantage derived from this embodiment is that the searchable database may be updated in near real time as changes are made.

The present invention is subject to numerous alternative embodiments that would be readily apparent to one skilled in the art. For example, the functions of hyperlinking and cross-referencing may be carried out on the mainframe, with the directories and files made available via the mainframe web server to PC clients

What is claimed is:

1. A method for providing a searchable database derived from a collection of information from a mainframe database, a corporate database, or a large data storage system having a plurality of data elements of multiple data types, each data element comprising a plurality of strings of characters or words, the method comprising:

storing all data elements of a same data type in a corresponding data file;

reading all the data elements in each data file a first time to determine names of the data elements and a data type associated with the data element names;

storing each data element name and corresponding data type in a data element database;

reading all the stored data elements in each data file a second time to examine the character strings or words of each data element;

determining whether any of the examined character strings or words of each data element match a data element name stored in the data element database, regardless of the associated data type of each data element name;

providing a hyperlink for each data element having an examined character string or word matching a data element name stored in the data element database;

storing each data element and any hyperlink in a directory of the data element database corresponding to a data type of a data element; and indexing data elements in each directory to provide the searchable database.

2. The method of claim 1 further comprising filtering all of the data elements in each data file to remove non-printable characters from the data elements in each data file.

3. The method of claim 1 wherein storing each data element in a directory of the data element database corresponding to the data type of the data element includes storing each read data element as a hyper text markup language file.

4. The method of claim 1 further comprising creating a record in a cross reference database every time a hyperlink is associated with a data element.

5. The method of claim 1 further comprising comparing data files for each data type to new data files for each data type to determine added data elements for each data type.

6. The method of claim 5 further comprising:

reading all added data elements in each new data file a first time to determine names of the added data elements and a data type associated with the added data element names;

storing each added data element name and corresponding data type in the data element database;

reading all the added data elements in each new data file a second time to examine character strings or words of each added data element;

determining whether any of the examined character strings or words of each added data element match a data element name stored in the data element database, regardless of the associated data type of each data element name;

providing a hyperlink for each added data element having an examined character string or word matching a data element name stored in the data element database;

storing each added data element and any corresponding hyperlink in a directory of the data element database corresponding to a data type of an added data element; and indexing all data elements in each directory to provide a searchable database.

7. The method of claim 1 further comprising comparing data files for each data type to new data files for each data type to determine changed data elements for each data type.

8. The method of claim 7 further comprising:
reading all changed data elements in each new data file a first time to determine names of the changed data elements and a data type associated with the changed data element names;
storing each changed data element name and corresponding data type in the data element database;
reading all the changed data elements in each new data file a second time to examine character strings or words of each changed data element;
determining whether any of the examined character strings or words of each changed data element match a data element name stored in the data element database, regardless of the associated data type of each data element name;
providing a hyperlink for each changed data element having an examined character string or word matching a data element name stored in the element database;
storing each changed data element and any corresponding hyperlink in a directory of the data element database corresponding to a data type of a changed data element; and
indexing all data elements in each directory to provide a searchable database.

9. The method of claim 1 further comprising comparing data files for each data type to new data files for each data type to determine deleted data elements and providing an indication in saved data elements in the searchable database corresponding to the deleted data elements as being archived.

10. The method of claim 1 wherein the data types include one or more of jobs, controls, programs, copy books, source code, procedures, emails, documents, and natural language files.

11. The method of claim 1 further comprising identifying all data elements of the collection of information by sequentially scanning the collection to identify all data elements belonging to data type.

12. The method of claim 11 wherein identifying all data elements further comprises grouping all data elements of the same type into the corresponding data file.

13. The method of claim 12 wherein grouping all data elements further comprises separating data elements by a separator identifier.

14. A searchable database system derived from a collection of information from a mainframe database, a corporate database, or a large data storage system having a plurality of data elements of multiple data types, each data element comprising a plurality of strings of characters or words, the systems comprising:
an interface to receive a plurality of data files storing all data elements of a same data type;
a data element database including a plurality of directories for each data type;
a searchable database; and
a processor to:
read all the stored data elements in each data file a first time to determine names of the data elements and a data type associated with the data element names;
store each data element name and corresponding data type in the data element database;
read all the stored data elements in each data file a second time to examine the character strings or words of each data element;
determine whether any of the examined character strings or words of each data element match a data element name stored in the data element database, regardless of the associated data type of each element name;
provide a hyperlink for each data element having an examined character string or word matching a data element name stored in the data element database;
store each data element and any hyperlink in a directory of the data element database corresponding to a data type of a data element; and
index data elements in each directory to create the searchable database.

15. The system of claim 14 wherein all of the data elements in each data file are filtered to remove non-printable characters from the data elements in each data file.

16. The system of claim 14 wherein each stored data element is a hyper text markup language file.

17. The system of claim 14 further comprising a cross reference database wherein the processor is configured to create a record in the cross reference database every time a hyperlink is associated with a data element.

18. The system of claim 14 wherein the interface is configured to receive new data files and the processor is configured to compare the data files for each data type to the new data files for each data type to determine added data elements for each data type.

19. The system of claim 18 wherein the processor is configured to:
read all added data elements in each new data file a first time to determine names of the added data elements and a data type associated with the added data element names;
store each added data element name and corresponding data type in the data element database;
read all the added data elements in each new data file a second time to examine the character strings or words of each added data element;
determine whether any of the examined character strings or words of each added data element match a data element name stored in the data element database, regardless of the associated data type of each element name;
provide a hyperlink for each added data element having an examined character string or word matching a data element name stored in the data element database;
store each added data element and any corresponding hyperlink in a directory of the data element database corresponding to a data type of an added data element; and
index all data elements in each directory to provide the searchable database.

20. The system of claim 14 wherein the interface is configured to receive new data files and the processor is configured to compare the data files for each data type to the new data files for each data type to determine changed data elements for each data type.

21. The system of claim 20 wherein the processor is configured to:
read all changed data elements in each new data file a first time to determine names of the changed data elements and a data type associated with the changed data element names;
store each changed data element name and corresponding data type in the data element database;
read all the changed data elements in each new data file a second time to examine character strings or words of each changed data element;

determine whether any of the examined character strings or words of each changed data element match a data element name stored in the data element database, regardless of the associated data type of each element name;

provide a hyperlink for each changed data element having an examined character string or word matching a data element name stored in the data element database;

store each changed data element and any corresponding hyperlink in a directory of the data element database corresponding to a data type of a changed data element; and index all data elements in each directory to provide a searchable database.

22. The system of claim 14 wherein the interface is configured to receive new data files and the processor is configured to compare the data files for each data type to the new data files for each data type to determine deleted data elements and to provide an indication in saved data elements in the searchable database corresponding to the deleted data elements as being archived.

23. The system of claim 14 wherein the data types include one or more of jobs, controls, programs, copy books, source code, procedures, emails, documents, and natural language files.

* * * * *